L. BALDWIN.
Cultivators.

No. 137,649. Patented April 8, 1873.

Witnesses:
E. H. Bates.
Phil. C. Masi.

Inventor:
Lorenzo Baldwin,
Chipman Hosmer & Co
Attorneys.

UNITED STATES PATENT OFFICE.

LORENZO BALDWIN, OF STONE MILLS, NEW YORK.

IMPROVEMENT IN CULTIVATORS.

Specification forming part of Letters Patent No. 137,649, dated April 8, 1873; application filed November 23, 1872.

*To all whom it may concern:*

Be it known that I, LORENZO BALDWIN, of Stone Mills, in the county of Jefferson and State of New York, have invented a new and valuable Improvement in Cultivators; and I do hereby declare that the following is a full, clear, and exact description of the construction and operation of the same, reference being had to the annexed drawing making a part of this specification, and to the letters and figures of reference marked thereon.

Figure 1:
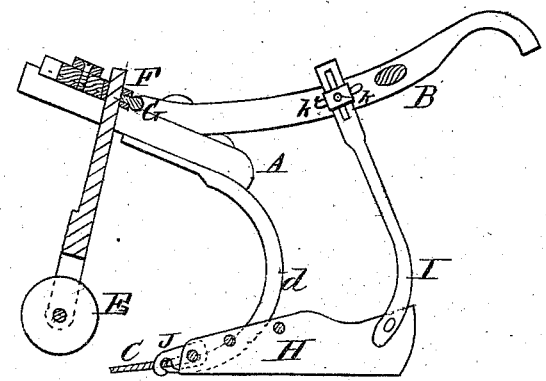
Figure 2:
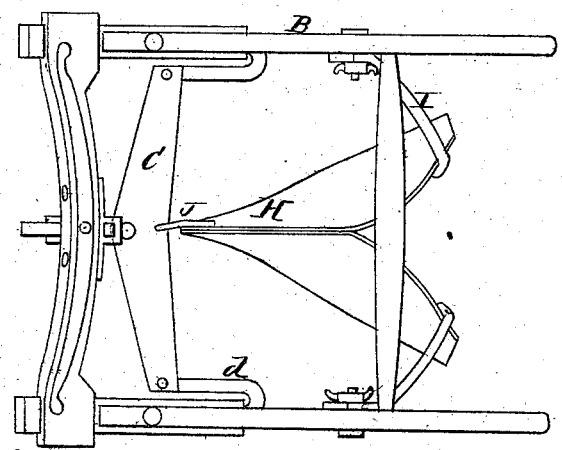
Figure 3:
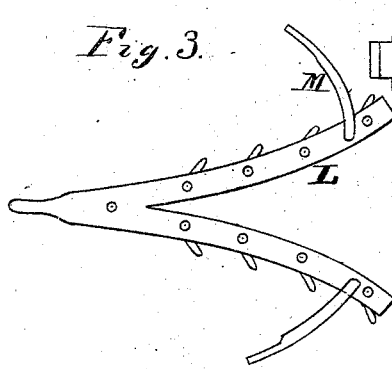
Figure 4:
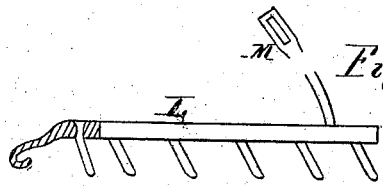

Figure 1 of the drawing is a vertical section of my cultivator. Fig. 2 is a top view of same. Figs. 3 and 4 are details of same.

My invention has relation to horse-hoes; and it consists in the construction and novel arrangement of the frame of the implement, the adjustable caster-wheel and attachments, the hoeing-blade, the adjustable mold-board, and the adjustable harrow, which is interchangeable with the mold-board, all substantially as hereinafter more fully described.

Referring to the accompanying drawing, A designates the frame of the implement having handles B B. C represents the angular hoe-blade, to be about two feet wide, with oblique outwardly-receding edges, and secured in an inclined position to curved arms $d$ depending from the frame A. E denotes the caster-wheel, located in front of the hoe-blade, with its standard adjustable, and secured in a slotted plate, F, by means of a set-screw, G. H designates the double-winged mold-board used for hilling, secured to the handles B by slotted adjustable arms I, held by bolts $k$ and thumb-nuts $k'$, and attached to the hoe-blade by means of a hook, J. The mold-board may be taken off and the harrow L substituted. The harrow has slotted adjustable arms M and a hook, $m$, and is therefore attached to the handles B and hoe-blade in the same way as the mold-board. The harrow is used first to pulverize the soil and make it smooth.

The implement may be used sometimes without mold-board or harrow.

Having fully described my invention, what I claim as new, and desire to secure by Letters Patent, is—

The combination of the frame and its blade C and adjustable wheel E, when fitted for the interchangeable plow and harrow, substantially as specified.

In testimony that I claim the above I have hereunto subscribed my name in the presence of two witnesses.

LORENZO BALDWIN.

Witnesses:
    SYLVESTER GREEN,
    D. H. LINGENFELTER.